(12) United States Patent
Wang et al.

(10) Patent No.: US 9,482,445 B2
(45) Date of Patent: Nov. 1, 2016

(54) HEAT PUMP WATER HEATER WITH HEAT UTILIZATION BALANCE PROCESSOR AND HEAT UTILIZATION BALANCE PROCESSOR THEREOF

(71) Applicant: JIANGSU TENESUN ELECTRICAL APPLIANCE CO., LTD., Nantong, Jiangsu (CN)

(72) Inventors: Yujun Wang, Jiangsu (CN); Tianshu Wang, Jiangsu (CN); Jun Liu, Jiangsu (CN); Kun Li, Jiangsu (CN); Xiaohu Li, Jiangsu (CN); Yi Yang, Jiangsu (CN); Ying Wang, Jiangsu (CN)

(73) Assignee: JIANGSU TENESUN ELECTRICAL APPLIANCE CO., LTD., Nantong Economic & Technological Development Zone, Nantong, Jiangsu (CN)

( * ) Notice: Subject to any disclaimer, the term of this patent is extended or adjusted under 35 U.S.C. 154(b) by 401 days.

(21) Appl. No.: 14/123,472

(22) PCT Filed: Apr. 22, 2013

(86) PCT No.: PCT/CN2013/074501
§ 371 (c)(1),
(2) Date: Dec. 2, 2013

(87) PCT Pub. No.: WO2014/036835
PCT Pub. Date: Mar. 13, 2014

(65) Prior Publication Data
US 2015/0114316 A1 Apr. 30, 2015

(30) Foreign Application Priority Data

Sep. 6, 2012 (CN) .......................... 2012 1 0327619
Sep. 6, 2012 (CN) .......................... 2012 1 0328725

(51) Int. Cl.
*F24H 4/02* (2006.01)
*F24H 4/04* (2006.01)
(Continued)

(52) U.S. Cl.
CPC *F24H 4/02* (2013.01); *F24H 4/04* (2013.01); *F24H 9/2007* (2013.01); *F25B 13/00* (2013.01);
(Continued)

(58) Field of Classification Search
CPC .......... F24H 4/02; F24H 9/2007; F24H 1/00; F24H 4/00; F24H 4/04; F25B 13/00; F25B 40/00; F25B 43/006; F25B 2400/23; F25B 2400/051; F25B 2313/003; F25B 2313/004; F28D 1/0472; F28D 1/0473
USPC ........................................................ 122/15.1
See application file for complete search history.

(56) References Cited

U.S. PATENT DOCUMENTS 1,913,573 A * 6/1933 Turner .................. F28D 1/0472
165/176
3,446,032 A * 5/1969 Bottum .................... F25B 40/00
165/156

(Continued)

FOREIGN PATENT DOCUMENTS

CN 2763760 Y 3/2006
CN 1849485 A 10/2006

(Continued)

OTHER PUBLICATIONS

Translation of CN1849485.*

(Continued)

*Primary Examiner* — Ryan J Walters
*Assistant Examiner* — Christopher R Zerphey
(74) *Attorney, Agent, or Firm* — Global IP Services; Tianhua Gu

(57) ABSTRACT

A heat pump water heater with a heat utilization balance processor and a heat utilization balance processor thereof relate to a fluid heater using a heat pump and an accessory thereof, the heat pump water heater comprises the heat utilization balance processor; which comprises a housing, a heat exchange pipe, a main heat exchange cavity, a sub heat exchange cavity and a steam-liquid separator. The heat utilization balance exchange is carried out for a working substance through the sub heat exchange cavity of the heat utilization balance processor during a condensing process and an evaporation process, so as to carry out the heat comprehensive utilization, thus increasing condensing effect, decreasing high pressure and exhaust temperature, decreasing the power consumption of a compressor, and increasing the energy efficient of a unit.

5 Claims, 3 Drawing Sheets

(51) Int. Cl.
 *F24H 9/20* (2006.01)
 *F25B 13/00* (2006.01)
 *F25B 40/00* (2006.01)

(52) U.S. Cl.
 CPC .......... *F25B 40/00* (2013.01); *F25B 2313/003* (2013.01); *F25B 2400/051* (2013.01); *F25B 2400/054* (2013.01); *F25B 2400/23* (2013.01); *Y02B 30/12* (2013.01)

(56) References Cited

U.S. PATENT DOCUMENTS

| | | | | |
|---|---|---|---|---|
| 4,217,765 | A * | 8/1980 | Ecker | F25B 43/006 62/503 |
| 6,032,482 | A * | 3/2000 | Krauss | F25B 40/00 165/164 |
| 6,463,757 | B1 * | 10/2002 | Dickson | F25B 40/00 29/890.06 |
| 2003/0121648 | A1 * | 7/2003 | Hong | F25B 40/00 165/163 |
| 2006/0080997 | A1 * | 4/2006 | Haussmann | F25B 40/00 62/503 |
| 2008/0000261 | A1 | 1/2008 | Heckt et al. | |
| 2009/0241569 | A1 * | 10/2009 | Okada | F25B 40/00 62/196.1 |
| 2009/0282861 | A1 * | 11/2009 | Setoguchi | F25B 13/00 62/525 |
| 2011/0197600 | A1 * | 8/2011 | Hamada | F24H 4/04 62/79 |

FOREIGN PATENT DOCUMENTS

| | | |
|---|---|---|
| CN | 201964677 U | 9/2011 |
| CN | 102798254 A | 11/2012 |
| CN | 102809217 A | 12/2012 |
| CN | 202835787 U | 3/2013 |
| CN | 202853208 U | 4/2013 |
| EP | 1808654 A2 | 7/2007 |
| JP | 2005180836 A | 7/2005 |

OTHER PUBLICATIONS

JPH 1019421 A (Nippondenso Co., Ltd. et al.), Jan. 23, 1998, the whole document.

* cited by examiner

Enlarged Part D

HEAT PUMP WATER HEATER WITH HEAT UTILIZATION BALANCE PROCESSOR AND HEAT UTILIZATION BALANCE PROCESSOR THEREOF

CROSS REFERENCE TO RELATED PATENT APPLICATION

The present application is the US national stage of PCT/CN2013/074501 filed on Apr. 22, 2013, which claims the priorities of the Chinese patent application No. 201210328725.4 filed on Sep. 06, 2012 and 201210327619.4 filed on Sep. 06, 2012, which applications are incorporated herein by reference.

FIELD OF THE INVENTION

The invention relates to a fluid heater using a heat pump and an accessory thereof and in particular to a heat pump water heater with a heat utilization balance processor suitable for an environmentally friendly refrigerant of an R407C.

BACKGROUND OF THE INVENTION

A heat pump water heater has been widely used because of its advantages of energy saving, environmental protection and safety. A heat pump special compressor uses two kinds of refrigerants of an R22 and an R407C, wherein the R407C of refrigerant is an eco-friendly refrigerant. According to "Montreal Protocol", the R22 is taken as a HCFC of working substance and is the second batch of substance to be replaced. The fourth meeting of States Parties of "Protocol" held in Copenhagen, Denmark in 1992 has decided to advance the disable time of the R22 to be 2020; hence it has become increasingly close that the refrigeration system uses environmentally friendly alternative refrigerants. The R407C of the refrigerant, as an important alternative of R22 refrigerant, is a mixed working substance and a non-azeotropic mixture of an R125, an R32 and an R134a (25/23/52% by weight percentage) with temperature glide of 7K. The temperature glide is the change value of the phase transition temperature of the mixture of the refrigerants when the phase transition of the mixture occurs under the constant pressure. As to the non-azeotropic mixed refrigerant, its phase change temperature will greatly vary during the phase transition process. Therefore, a heat exchanger shall be optimized; otherwise the temperature glide will have a serious impact on the refrigeration of a device. The R407C of the environmentally friendly refrigerant is a long-term alternative of the R22 in some applications. After the R22 of an equipment with a tube-and-shell-type heat exchanger and of the prior condenser and the prior evaporator is directly converted into the R407C of the refrigerant, the surface heat transfer coefficient will be relatively low, resulting in changes of heat exchange performance and the changes of the status of the thermodynamic cycle of a system; therefore, it is very important to re-research the technology of the system using the R407C of the refrigerant Chinese utility model patent of "a refrigerant cycle device of an R407C of a refrigerant environmentally friendly industrial chiller" (Chinese utility model patent No.: ZL 200820301799.8, Authorized Public No.: CN201281485Y) discloses the refrigerant cycle device of the R407C of the refrigerant environmentally friendly industrial chiller, including a condensing heat exchanger connected with external cooling water through inlet and outlet pipes, a compressors and an evaporation heat exchanger connected with external water to be cooled through the inlet and outlet pipes. The three all form a closed loop through pipe connection, being characterized in that: The evaporation heat exchanger is a plate-type evaporator absorbing the heat from the cooled water through the evaporation of the R407C of the refrigerant. The flow direction of the cooled water therein is opposite to that of the R407C of the refrigerant and forms whole counter-current heat exchange. The condensing heat exchanger releases the heat to the plate-type condenser of the cooled water through the condensation of the R407C of the refrigerant. The flow direction of the cooled water therein is opposite to that of the R407C of the refrigerant and forms whole countercurrent heat exchange. Hence, a refrigerant circulating system effectively prevents the temperature glide from significantly affecting the heat exchange amount of the heat exchange when the R407C of the refrigerant condenses and evaporates and avoid imbalance of a system. The utility model is applied to an industrial chiller which meets the CFC-free environmentally friendly requirements and uses the alternative environmentally friendly refrigerant of the R407C as the refrigerant, which has stable and reliable heat transfer characteristics. Chinese invention patent application of "an air conditioning heat exchanger with a mixed refrigerant and an air conditioner" (Chinese Patent Application No.: 201210036236.1, Publication Number: CN 102538308A) discloses the air conditioning heat exchanger with the mixed refrigerant and the air conditioner, comprising a finned pipe heat exchanger, a manifold pipe, at least two ways of splitting pipes and a shunt connecting the manifold pipe and every the splitting pipe. The manifold pipe is connected with an inlet end of the shunt. A shunt outlet of the shunt is respectively connected with one end of each of the splitting pipe, and the other end of the splitting pipe is respectively connected with a pipeline on the heat exchanger of a finned pipe, so as to solve the problem of the temperature glide of the mixed refrigerant because of non-azeotropy, and improve the efficiency and the heating capacity of the heat exchanger of the air conditioner. Although the above utility model and the invention respectively propose the different technical solutions solving the problem of the temperature glide of the mixed refrigerant, the technical solution in the prior art adapts to the temperature glide of the mixed refrigerant by controlling the temperature of the heat exchanger, which does not fundamentally solve the problem of the imbalance of the phase change process caused by the non-isothermal characteristic of the phase change of the R407C of the non-azeotropic mixed working substance.

SUMMARY OF THE INVENTION

The objective of the invention is to provide a heat pump water heater with a heat utilization balance processor. The heat utilization balance exchange is carried out for the working substance with different phases during a condensing process and an evaporation process, so as to decrease the serious impact of the temperature glide of a mixed refrigerant on the operation performance and the safety of equipment.

The invention adopts the following technical solution to solve the above technical problems:

A heat pump water heater with a heat utilization balance processor comprises a circulation loop of a working substance and a circulation loop of heat water, wherein the circulation loop of the working substance comprises a compressor, a four-way valve, a condenser, an expansion valve and a evaporator; the circulation loop of the heat water comprises a circulating water pump and a heat insulated water tank, wherein the heat pump water heater also comprises a heat utilization balance processor; the heat utilization balance processor comprises a housing, a heat exchange pipe, a main heat exchange cavity, a sub heat exchange cavity and a steam-liquid separator, as well as a working substance inlet, a working substance outlet, a water inlet, a water outlet, a steam inlet and a steam outlet which are communicated with the outer part of the housing; the heat exchange pipe is placed in the main heat exchange cavity; the steam-liquid separator is placed in and combined with the housing and forms the sub heat exchange cavity.

The main heat exchange cavity is connected with the condenser through the working substance inlet; the sub heat exchange cavity is connected with the expansion valve through the working substance outlet; the steam inlet is connected with the evaporator through the four-way valve; the steam outlet is connected with a suction port of the compressor; the inner part of the heat exchange pipe is a heat medium water channel; one end of the heat exchange pipe is connected with a water inlet pipeline of outer cool water through the water inlet and via one solenoid valve, and the other end thereof is connected with the heat insulated water tank of the circulation loop of heat water through the water outlet.

The circulation loop of the working substance of the heat pump water heater is as follows: the compressor->the four-way valve->the condenser->the main heat exchange of the heat utilization balance processor->the sub heat exchange cavity of the heat utilization balance processor->the expansion valve->the evaporator->the four-way valve->the steam-liquid separator of the heat utilization balance processor->the compressor.

The invention provides a preferred technical solution of a heat pump water heater with a heat utilization balance processor, wherein one inner tube is provided at the upper half part of the inner part of the housing of the heat utilization balance processor; the main heat exchange cavity is the space formed between the upper half part of the housing and the inner tube; and the heat exchange pipe is coiled into the helical shape and placed in the main heat exchange cavity. A steam cylindrical body of the steam-liquid separator is placed in the lower half part of the inner part of the housing; the sub heat exchange cavity is the space formed between the lower half part of the housing and the outer periphery of the steam cylindrical body; the upper part of the main heat exchange cavity is communicated with the working substance inlet placed at the outer part of the housing, and the lower part thereof is provided with a working substance passage hole communicated with the sub heat exchange cavity; and the bottom part of the sub heat exchange cavity is communicated with the working substance outlet placed in the outer part of the housing.

The invention provides a relatively good technical solution of a heat pump water heater with a heat utilization balance processor, wherein the heat exchange pipe and the main heat exchange cavity form a low-frequency turbulence heat exchanger structure; the heat exchange pipe is a Twist spiral pipe of which the inner and the outer surfaces are both provided with a valley structure with a convex-concave spiral twist; and a convex spiral of the outer wall of the heat exchange pipe is close to the inner wall of the main heat exchange cavity and forms the low-frequency turbulence heat exchanger structure with a spiral-shaped working substance passage.

The invention provides a better technical solution of a heat pump water heater with a heat utilization balance processor, wherein the outer periphery of the steam cylindrical body is provided with a spiral fin; and the inner wall of the housing is close to the spiral fin of the outer periphery of the steam cylindrical body and forms the sub heat exchange cavity with a coiled pipe structure.

The invention provides a preferred technical solution of a heat pump water heater with a heat utilization balance processor, wherein the heat utilization balance processor carries out the heat utilization balance exchange for a working substance with different phases during the condensing and the evaporation processes; the liquid-state high-temperature working substance during the condensing process enters into the heat utilization balance processor through the working substance inlet; after the liquid-state high-temperature working substance goes through the main heat exchange cavity and carries out the heat exchange with heat medium water in the heat exchange pipe, it, in the sub heat exchange cavity, once again carries out the heat exchange with a vapor-state low-temperature working substance entering the steam cylindrical body through the steam inlet during the evaporation process; the working substance in the sub heat exchange cavity is further cooled to be supercooled state during the heat exchange process and enters into the evaporator through the working substance outlet, so as to increase the efficiency that the evaporator absorbs the heat from an air source; at the same time, the working substance in the steam cylindrical body is heated during the heat exchange process, is fully vaporized to be superheated steam, flows out of the steam outlet and enters into the compressor, so as to prevent the liquid-state working substance from entering the compressor and causing liquid impact faults.

The other objective of the invention is to provide a heat utilization balance processor used for the above heat pump water heater to realize the heat utilization balance exchange for the working substance with different phases during a condensing process and an evaporation process. The invention adopts the following technical solution to solve the above technical problem:

A heat utilization balance processor used for the above heat pump water heater is connected with the heat pump or cooling circulation system of the non-azeotropic mixed refrigerant, and comprises a housing, a heat exchange pipe, a working substance inlet, a working substance outlet, a water inlet, a water outlet and a steam-liquid separator, wherein an inner tube is provided at the upper half part of the inner part of the housing; the space formed between the upper half part of the housing and the inner tube constitutes one main heat exchange cavity; and the heat exchange pipe is coiled into the helical shape and placed in the main heat exchange cavity.

The steam-liquid separator consists of a steam cylindrical body, a steam inlet and a steam outlet; the steam cylindrical body is placed in the lower half part of the inner part of the housing; the space formed between the lower half part of the housing and the outer periphery of the steam cylindrical body constitutes a sub heat exchange cavity.

The upper part of the main heat exchange cavity is communicated with the working substance inlet placed at the outer part of the housing, and the lower part thereof is communicated with the sub heat exchange cavity through a working substance passage hole; and the bottom part of the sub heat exchange cavity is communicated with the working substance outlet placed in the outer part of the housing.

The working substance inlet and the working substance outlet are connected with the high-pressure working substance loop of the heat pump water heater or cooling circulation system; the steam-liquid separator is connected with the low-pressure working substance loop of the heat pump water heater or cooling circulation system through the steam inlet and the steam outlet; the inner part of the heat exchange pipe is a heat medium water channel; and the two ends of the heat exchange pipe are connected with the heat medium water circulation loop of the heat pump water heater or cooling circulation system respectively a water inlet and a water outlet.

The invention provides a relatively good technical solution of a heat pump water heater with a heat utilization balance processor, wherein the heat exchange pipe and the main heat exchange cavity form a low-frequency turbulence heat exchanger structure; the heat exchange pipe is a Twist spiral pipe of which the inner and the outer surfaces are both provided with a valley structure with a convex-concave spiral twist; and a convex spiral of the outer wall of the heat exchange pipe is close to the inner wall of the main heat exchange cavity and forms the low-frequency turbulence heat exchanger structure with a spiral-shaped working substance passage.

The invention provides a better technical solution of a heat pump water heater with a heat utilization balance processor, wherein the outer periphery of the steam cylindrical body is provided with a spiral fin; and the inner wall of the housing is close to the spiral fin of the outer periphery of the steam cylindrical body and forms the sub heat exchange cavity with a coiled pipe structure.

The invention provides a preferred technical solution of a heat pump water heater with a heat utilization balance processor, wherein the heat utilization balance processor carries out the heat utilization balance exchange for a working substance with different phases during the condensing and the evaporation processes; the liquid-state high-temperature working substance during the condensing process enters into the heat utilization balance processor through the working substance inlet; after the liquid-state high-temperature working substance goes through the main heat exchange cavity and carries out the heat exchange with heat medium water in the heat exchange pipe, it, in the sub heat exchange cavity, once again carries out the heat exchange with a vapor-state low-temperature working substance entering the steam cylindrical body through the steam inlet during the evaporation process; the working substance in the sub heat exchange cavity is further cooled to be supercooled state during the heat exchange process and enters into the evaporator through the working substance outlet, so as to increase the efficiency that the evaporator absorbs the heat from an air source; at the same time, the working substance in the steam cylindrical body is heated during the heat exchange process, is fully vaporized to be a superheated gas, flows out of the steam outlet and enters into the compressor, so as to prevent the liquid-state working substance from entering the compressor and causing liquid impact faults.

Compared with the prior art, the invention has the following advantages:

1. A heat pump water heater with a heat utilization balance processor in the invention carries out heat utilization balance exchange for a working substance with different phases in a sub heat exchange cavity during a condensing process and an evaporation process, thus solving the problem of imbalance of phase transition process because of non-isothermal characteristic of the phase transition of an R407C of a non-azeotropic mixed working substance, eliminating the impact of the temperature glide of a mixed refrigerant on the operation performance and safety of the equipment, and particularly adapting an R407C environmentally friendly refrigerant system.

2. The heat pump water heater with the heat utilization balance processor in the invention carries out heat comprehensive utilization for a pre-throttled refrigerant through the heat utilization balance processor, thus preheating the cool water in a complementally feeding water tank, increasing the condensation effect of a condensation side, effectively decreasing high pressure and exhaust temperature, decreasing the power consumption of a compressor, and increasing the power consumption of a unit and the water temperature of the supplementing water of a heat insulated water tank at the same time.

3. The heat pump water heater with the heat utilization balance processor in the invention re-condenses the refrigerant in a condenser, thus guaranteeing the refrigerant to be under overcooling state before entering an expansion valve, avoiding some of the refrigerant to be under gaseous state before throttling when the water temperature is high, and avoiding the occurrence of gas blocking phenomenon of an expansion valve which causes a system to improperly work.

4. As to the heat pump water heater with the heat utilization balance processor in the invention, the refrigerant of an evaporator is re-heated by the heat utilization balance processor and enthalpy value is increased, thus guaranteeing the refrigerant of the compressor to be overheated gas, preventing the compressor from occurring liquid impact phenomenon, and increasing the reliability of the system.

5. The heat utilization balance processor is used for the heat balance processing of a heat pump system and carries out the heat comprehensive utilization, thus guaranteeing the overcooling and overheating of the system, increasing the energy efficiency coefficient of the unit, and facilitating the unit to be stably operated.

6. A main heat exchange cavity of the heat utilization balance processor used in the invention adopts a low-frequency turbulence heat-exchange technology to facilitate a tube pass and a shell pass to be under the spiral pipe flow state at the same time, thus promoting turbulence, increasing heat transfer efficiency, and facilitating the total heat transfer coefficient of the invention to be increased by 40% than that of the convention heat exchanger.

7. The heat utilization balance processor used in the invention adopts the low-frequency turbulence heat exchange technology to produce obvious disturbance both inside and outside of the tube when a medium flows through a spiral pipe and produce the low-frequency jog at the same time, thus possessing relatively strong self-cleaning effect and un-easy scaling. Meanwhile, the design of the structures of peaks and troughs of a heat exchange pipe also facilitates the heat exchange pipe to possess an automatic compensation function of thermal stress.

The parts of the above figures are indicated with the following mark numbers: 1: Compressor; 2: Four-Way Valve; 3: Condenser; 4: Heat Utilization Balance Processor; 5: Expansion Valve; 6: Evaporator 7: Vapor-Liquid Separator; 8: Circulating Water Pump; 9: heat insulated water tank; 10: Solenoid Valve; 401: Working Substance Inlet; 402: Working Substance Outlet; 403: Main Heat Exchange Cavity; 404: Working Substance Passage Hole; 405: Sub Heat Exchange Cavity; 411: Water Inlet; 412: Water Outlet; 415: Heat Medium Water Channel; 41: Housing; 42: Heat Exchange Pipe; 43: Inner Tube; 7: Steam-Liquid Separator; 701: Steam Inlet; 702: Steam Outlet; 71: Steam Cylindrical Body; 711: Spiral Fin; 703: Filtering Screen.

DETAILED DESCRIPTION OF EMBODIMENTS

Figure 1:
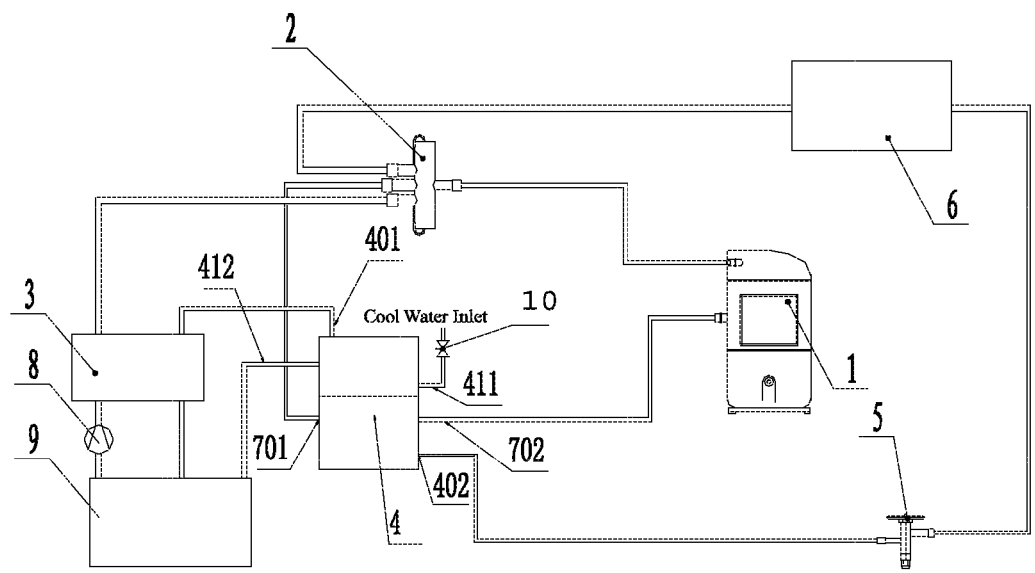
FIG. 1 is a systematic principle diagram of a heat pump water heater with a heat utilization balance processor of the invention.
Figure 2:
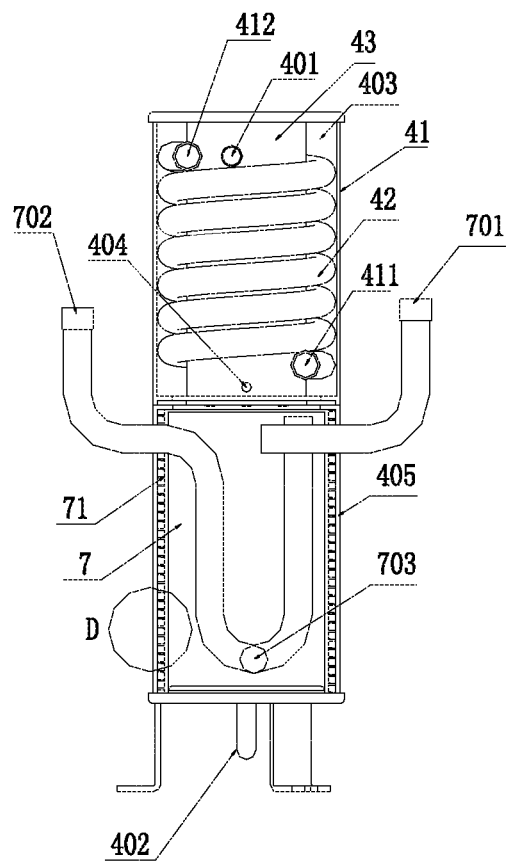
FIG. 2 is a schematic diagram of the structure of the inner part of a heat utilization balance processor of the invention.

In order to better understand the above technical solution of the invention, the invention is further described with the combination of figures and embodiments in the following:

FIG. 1 is a systematic schematic diagram of one embodiment of a heat pump water heater with a heat utilization balance processor of the invention. The heat pump water heater comprises a circulation loop of a working substance and a circulation loop of heat water, wherein the circulation loop of the working substance comprises a compressor 1, a four-way valve 2, a condenser 3, an expansion valve 5 and an evaporator 6; the circulation loop of the heat water comprises a circulating water pump 8 and a heat insulated water tank 9. In the example of a heat pump water heater shown in the invention, the heat pump water heater also comprises a heat utilization balance processor 4. FIG. 2 is a schematic diagram of the structure of a heat utilization balance processor 4; the heat utilization balance processor comprises a housing 41, a heat exchange pipe 42, a main heat exchange cavity 403, a sub heat exchange cavity 405 and a steam-liquid separator 7, as well as a working substance inlet 401, a working substance outlet 402, a water inlet 411, a water outlet 412, a steam inlet 701 and a steam outlet 702 which are communicated with the outer part of the housing; the heat exchange pipe 42 is placed in the main heat exchange cavity 403; and the steam-liquid separator 7 is placed in and combined with the housing 41 and constitutes the sub heat exchange cavity 405; please refer to FIG. 2 and FIG. 3.

In the example of the heat pump water heater of the heat utilization balance processor 4 shown in FIG. 1, wherein a main heat exchange cavity 403 is connected with a condenser 3 through a working substance inlet 401; wherein a sub heat exchange cavity 405 is connected with an expansion valve 5 through a working substance outlet 402; a steam inlet 701 is connected with an evaporator 6 through a four-way valve 2; a steam outlet 702 is connected with a suction port through a compressor 1; the inner part of the heat exchange pipe 42 is a heat medium water channel 415.

One end of the heat exchange pipe 42 is connected with a water inlet pipeline of outer cool water through a water inlet 411 and via a solenoid valve 10, and the other end thereof is connected with a heat insulated water tank 9 of a circulation loop of heat water through a water outlet 412. The circulation loop of a working substance of the heat pump water heater of the heat utilization balance processor 4 shown in FIG. 1 is as follows: compressor 1->four-way valve 2->condenser 3->main heat exchange cavity 403 of heat utilization balance processor 4->sub heat exchange cavity 405 of heat utilization balance processor 4->expansion valve 5->evaporator 6->the four-way valve 2->steam-liquid separator 7 of heat utilization balance processor 4->compressor 1.

In the example of a heat pump water heater with a heat utilization balance processor shown in FIG. 2, one inner tube 43 is provided at the upper half part of the inner part of a housing 41 of the heat utilization balance processor 4; the main heat exchange cavity 403 is the space formed between the upper half part of the housing 41 and the inner tube 43; the heat exchange pipe 42 is coiled as spiral shape and placed in the main heat exchange cavity 403; a steam cylindrical body 71 of the steam-liquid separator 7 is placed in the lower half part of the inner part of the housing 41; the sub heat exchange cavity 405 is the space formed between the lower half part of the housing 41 and the outer periphery of the steam cylindrical body 71; the upper part of the main heat exchange cavity 403 is communicated with a working substance inlet 401 placed at the outer part of the housing 41, and the lower part thereof is provided with a working substance passage hole 404 communicated with the sub heat exchange cavity; and the bottom part of the sub heat exchange cavity 405 is communicated with the working substance outlet 402 placed in the outer part of the housing 41.

Figure 3:
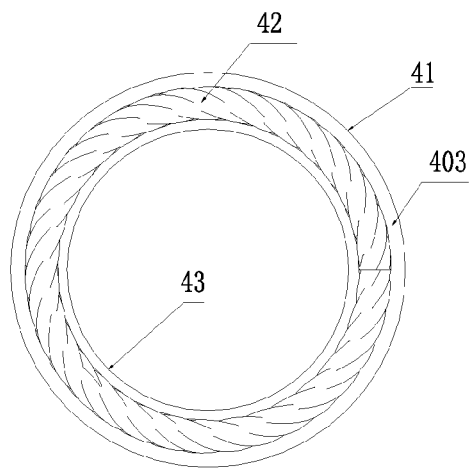
FIG. 3 is a schematic diagram of the structure of a main heat exchange cavity of a heat utilization balance processor.
Figure 4:
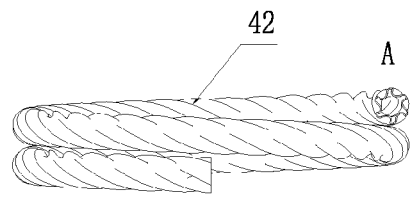
FIG. 4 is a schematic diagram of the structure of a heat exchange pipe of a heat utilization balance processor.
Figure 5:
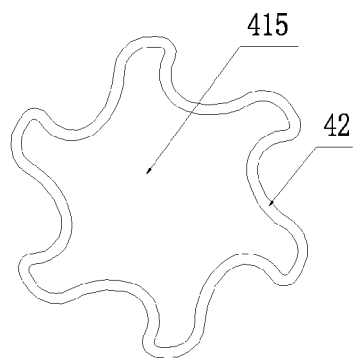
FIG. 5 is an enlarged diagram of the cross-section of A part of a heat exchange pipe of a heat utilization balance processor.

According to the example of a heat utilization balance processor 4 shown in FIG. 3 and FIG. 4, a heat exchange pipe 42 and a main heat exchange cavity 403 form a low-frequency turbulence heat exchanger structure; a heat exchange pipe 42 is a Twist spiral pipe of which the inner and the outer surfaces are both provided with a valley structure with a convex-concave spiral twist; please refer to an enlarged diagram of the cross section of A part in FIG. 5. A convex spiral of the outer wall of the heat exchange pipe 42 is close to the inner wall of the main heat exchange cavity 403 and forms the low-frequency turbulence heat exchanger structure with a spiral-shaped working substance passage. A convex part of the outer wall of the heat exchange pipe 42 is close to the inner wall of the heat exchange cavity 403; The spiral concave slot of the outer wall of the heat exchange pipe 42 and the inner wall of the heat exchange cavity 403 form a spiral-shaped working substance passage. The heat medium water of a pipe process and the working substance of a shell process are under the spiral pipe flowing state at the same time, thus improving turbulence and increasing heat transfer efficiency.

The heat utilization balance processor 4 in the invention is used for the heat pump water heater of a non-azeotropic mixed refrigerant or a cooling circulation system, and comprises a housing 41, a heat exchange pipe 42, a working substance inlet 401, a working substance outlet 402, a water inlet 411, a water outlet 412 and a steam-liquid separator 7, as shown in FIG. 2 and FIGS. 6-8.

One inner tube 43 is provided at the upper half part of the inner part of the housing 41; the space formed between the upper half part of the housing 41 and the inner tube 43 constitutes one main heat exchange cavity 403; and the heat exchange pipe 42 is coiled as spiral shape and placed in the main heat exchange cavity 403; please refer to FIGS. 2 and 3.

The steam-liquid separator 7 consists of a steam cylindrical body 71, a steam inlet 702 and a steam outlet 703; The steam cylindrical body 71 is placed at the lower part of the inner part of the housing. The space formed between the lower half part of the housing 41 and the outer periphery of the steam cylindrical body 71 constitutes one sub heat exchange cavity 405; please refer to FIG. 2 and FIG. 6.

The upper part of the main heat exchange cavity 403 is communicated with a working substance inlet 401 placed at the outer part of the housing 41, and the lower part thereof is communicated with the sub heat exchange cavity through a working substance passage hole 404; the bottom part of the sub heat exchange cavity 405 is communicated with the working substance outlet 402 placed in the outer part of the housing 41. The working substance inlet 401 and the working substance outlet 402 are connected with the high-pressure working substance loop of the heat pump water heater or cooling circulation system; the steam-liquid separator 7 is connected with the low-pressure working substance loop of the heat pump water heater or cooling circulation system through the steam inlet 401 and the steam outlet 402; the inner part of the heat exchange pipe 42 is a heat medium water channel 415; and the two ends of the heat exchange pipe 42 are connected with the heat medium water circulation loop of the heat pump water heater or cooling circulation system respectively through a water inlet 411 and a water outlet 412.

Figure 6:
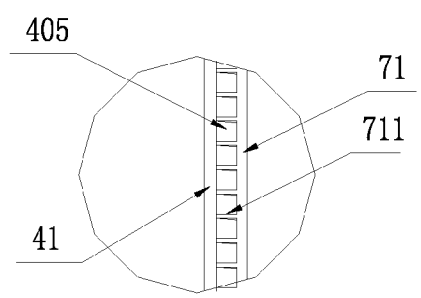
FIG. 6 is a partial enlarged diagram of a sub heat exchange cavity of the structure of a heat utilization balance processor.
Figure 7:
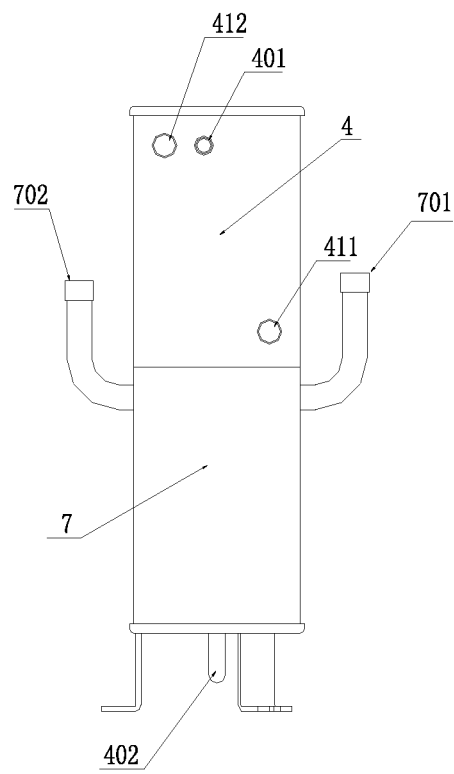
FIG. 7 is a schematic diagram of the structure of the outer part of a heat utilization balance processor of the invention.
Figure 8:
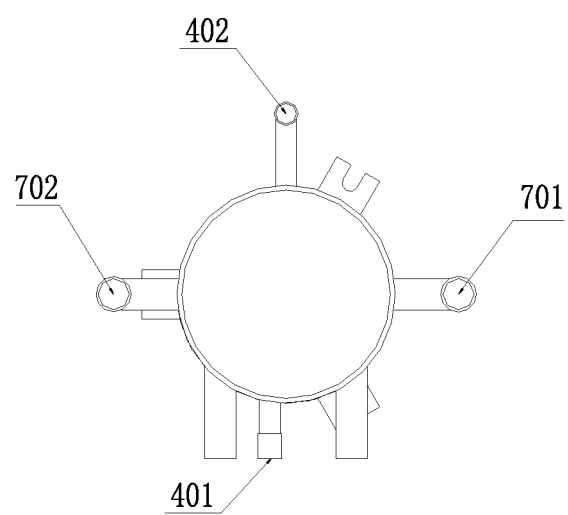
FIG. 8 is a top view of a heat utilization balance processor of the invention.

In the example of a heat utilization balance processor provided in the invention and shown in FIG. 2, the outer periphery of the steam cylindrical body 71 is provided with a spiral fin 711; the inner wall of the housing 41 is closed to a spiral fin 711 at the outer periphery of the steam cylindrical body 71 and forms a sub heat exchange cavity 405 with a coiled structure; please refer to an enlarged diagram of D part shown in FIG. 6. The convex part of the spiral chin 711 at the outer periphery of the steam cylindrical body 71 is close to the inner wall of the housing 41 and facilitates a sub heat exchange cavity 405 to form a spiral liquid-state high-pressure working substance passage. The working substance in the sub heat exchange cavity 405 is under the spiral pipe flow state, thus promoting turbulence and increasing heat transfer efficiency.

According to a preferred example of a heat pump water heater with a heat utilization balance processor 4 provided in the invention, the heat utilization balance processor 4 carries out the heat utilization balance exchange for a working substance with different phases during the condensing and the evaporation processes; the liquid-state high-temperature working substance during the condensing process enters into the heat utilization balance processor 4 through the working substance inlet 401; after the liquid-state high-temperature working substance goes through the main heat exchange cavity 403 and carries out the heat exchange with heat medium water in the heat exchange pipe 42, it, in the sub heat exchange cavity 405, once again carries out the heat exchange with a vapor-state low-temperature working substance entering the steam cylindrical body 71 through the steam inlet 701 during an evaporation process; the working substance in the sub heat exchange cavity 405 is further cooled to be supercooled state during the balance heat exchange process and enters into the evaporator 6 through the working substance outlet 402, so as to increase the efficiency that the evaporator 6 absorbs the heat from an air source; at the same time, the working substance in the steam cylindrical body 71 is heated during the heat exchange process, is fully vaporized to be superheated steam, flows out of the steam outlet 702 and enters into the compressor 1, so as to prevent the liquid-state working substance from entering the compressor 1 and causing liquid impact faults.

The above examples are only used for explaining and describing the invention and are not used for limiting the technical solution of the invention. The persons skilled in the art shall understand that the changes and variants within the spirit of the invention shall all be fallen in the protection scope claimed by the claims of the invention.

INDUSTRIAL APPLICABILITY

A heat utilization balance processor in the invention is provided in a heat pump water heater, thus realizign heat utilization balance exchange for a working substance with different phases in a sub heat exchange cavity during a condensing process and an evaporation process, solving the problem of imbalance of phase transition process because of non-isothermal characteristic of the phase transition of an R407C of a non-azeotropic mixed working substance, eliminating the impact of the temperature glide of a mixed refrigerant on the operation performance and safety of the equipment, and particularly adapting an R407C environmentally friendly refrigerant system.

Meanwhile, according to the technical solution, the refrigerant of a condenser is re-condensed, thus guaranteeing the refrigerant to be under overcooling state before entering an expansion valve, avoiding some of the refrigerant to be under gaseous state before throttling when the water temperature is high, and avoiding the occurrence of gas blocking phenomenon of an expansion valve which causes a system to improperly work. The heat pump water heater with the heat utilization balance processor in the invention is used. The refrigerant of an evaporator is re-heated by the heat utilization balance processor and enthalpy value is increased, thus guaranteeing the refrigerant of the compressor to be overheated gas, preventing the compressor from occurring liquid impact phenomenon, and increasing the reliability of the system.

Furthermore, the heat utilization balance processor in the invention is used for the heat balance processing of a heat pump system and carries out the heat comprehensive utilization, thus guaranteeing the overcooling and overheating of the system, increasing the energy efficiency coefficient of the unit, and facilitating the unit to be stably operated. The heat utilization balance processor in the invention carries out heat comprehensive utilization for a pre-throttled refrigerant, thus preheating the cool water in a complementally feeding water tank, increasing the condensation effect of a condensation side, effectively decreasing high pressure and exhaust temperature, decreasing the power consumption of a compressor, and increasing the power consumption of a unit and the water temperature of the supplementing water of a heat insulated water tank.

The technical solution may be applied for manufacturing a fluid heater utilizing a heat pump or for the design and manufacture of the parts thereof, especially for an equipment of an R407C of an environment-friendly refrigerant and with the heat utilization balance processor and the heat pump water heater.

What is claimed is:

1. A heat pump water heater with a heat utilization balance processor, comprising:

a circulation loop of the working substance, which comprises a compressor, a four-way valve, a condenser, an expansion valve and an evaporator;

a circulation loop of the heat water, which comprises a circulating water pump and a heat insulated water tank;

the heat utilization balance processor comprises a housing, a heat exchange pipe, a working substance inlet, a working substance outlet, a water inlet, a water outlet and a vapor-liquid separator, an inner tube is provided at an upper half part of an inner part of the housing, a space formed between the upper half part of the housing and the inner tube constitutes one main heat exchange cavity, the heat exchange pipe is coiled into a helical shape and placed in the main heat exchange cavity;

a vapor-liquid separator comprising a vapor cylindrical body, a vapor inlet and a vapor outlet is placed in a lower half part of the inner part of the housing, a space formed between the lower half part of the housing and an outer periphery of the vapor cylindrical body constitutes a sub heat exchange cavity;

an upper part of the main heat exchange cavity is communicated with a working substance inlet placed at an outer part of the housing, and a lower part thereof is communicated with the sub heat exchange cavity through a working substance passage hole, and a bottom part of the sub heat exchange cavity is communicated with a working substance outlet placed in the outer part of the housing;

the working substance inlet and the working substance outlet are connected with a high-pressure working substance loop of the heat pump water heater or a cooling circulation system, the vapor-liquid separator is connected with a low-pressure working substance loop of the heat pump water heater or the cooling circulation system through the vapor inlet and the vapor outlet an inner part of the heat exchange pipe is a heat medium water channel, two ends of the heat exchange pipe are connected with a heat medium water circulation loop of the heat pump water heater or the cooling circulation system through the water inlet and the water outlet;

the main heat exchange cavity is connected with the condenser through the working substance inlet, the sub heat exchange cavity is connected with the expansion valve through the working substance outlet, the vapor inlet is connected with the evaporator through the four-way valve; the vapor outlet is connected with a suction port of the compressor, the inner part of the heat exchange pipe is a heat medium water channel, one end of the heat exchange pipe is connected with a water inlet pipeline of outer cool water through the water inlet and via one solenoid valve, and the other end thereof is connected with the heat insulated water tank of the circulation loop of the heat water through the water outlet.

2. The heat pump water heater with the heat utilization balance processor according to claim 1, wherein the heat exchange pipe and the main heat exchange cavity form a turbulence heat exchanger structure; the heat exchange pipe is a twist spiral pipe of which inner and the outer surfaces are both provided with a valley structure with a convex-concave spiral twist; and a convex spiral of the outer wall of the heat exchange pipe is close to the inner wall of the main heat exchange cavity and forms the turbulence heat exchanger structure with a spiral-shaped working substance passage.

3. The heat pump water heater with the heat utilization balance processor according to claim 1, wherein an outer periphery of the vapor cylindrical body is provided with a spiral fin; and an inner wall of the housing is close to the spiral fin of the outer periphery of the vapor cylindrical body and forms the sub heat exchange cavity with a coiled pipe structure.

4. The heat pump water heater with the heat utilization balance processor according to claim 1, wherein the heat utilization balance processor carries out a heat utilization balance exchange for the working substance with different phases during a condensing process and an evaporation process; a liquid-state high-temperature working substance during the condensing process enters into the heat utilization balance processor through the working substance inlet; after going through the main heat exchange cavity and carrying out heat exchange with heat medium water in the heat exchange pipe, the liquid-state high-temperature working substance in the sub heat exchange cavity once again carries out heat exchange with a vapor-state low-temperature working substance entering the vapor cylindrical body through the vapor inlet during the evaporation process; the working substance in the sub heat exchange cavity is further cooled to a supercooled state during the heat exchange process and enters into the evaporator through the working substance outlet, so as to increase the efficiency that the evaporator absorbs the heat from an air source; at the same time, the working substance in the vapor cylindrical body is heated during the heat exchange process, is fully vaporized to be a superheated gas, flows out of the vapor outlet and enters into the compressor, so as to prevent the liquid-state working substance from entering the compressor and causing liquid impact faults.

5. The heat pump water heater with b2the heat utilization balance processor according to claim 1, wherein an outer periphery of the vapor cylindrical body is provided with a spiral fin; and an inner wall of the housing is close to the spiral fin of the outer periphery of the vapor cylindrical body and forms the sub heat exchange cavity with a coiled pipe structure.

* * * * *